US005399372A

United States Patent [19]

Grimes et al.

[11] Patent Number: 5,399,372

[45] Date of Patent: Mar. 21, 1995

[54] METHOD OF PATTERNING MAGNETIC MEMBERS

[75] Inventors: Graig A. Grimes, Mountain View; Robert L. Cormia, Sunnyvale, both of Calif.

[73] Assignee: Southwall Technologies, Inc., Del.

[21] Appl. No.: 152,312

[22] Filed: Nov. 8, 1993

[51] Int. Cl.[6] ........................ H01F 10/08; B32B 7/06; G08B 13/24

[52] U.S. Cl. .................................... 427/131; 427/129; 156/289; 340/551; 340/572

[58] Field of Search ............... 156/230, 247, 249, 289, 156/344; 427/128, 129, 131, 132; 340/551, 572

[56] References Cited

U.S. PATENT DOCUMENTS

| | | | |
|---|---|---|---|
| 4,152,476 | 5/1979 | Stillman | 156/230 |
| 4,682,154 | 7/1987 | Fearon et al. | 340/572 |
| 4,935,724 | 6/1990 | Smith | 340/551 |
| 4,956,636 | 9/1990 | Sansom et al. | 340/551 |
| 4,960,651 | 10/1990 | Pettigrew et al. | 428/607 |
| 4,967,185 | 10/1990 | Montean | 340/572 |
| 5,017,255 | 5/1991 | Calhoun et al. | 156/230 |
| 5,083,112 | 1/1992 | Piotrowski et al. | 340/572 |
| 5,219,655 | 6/1993 | Calhoun et al. | 428/344 |

*Primary Examiner*—George Fourson
*Assistant Examiner*—Thomas G. Bilodeau
*Attorney, Agent, or Firm*—Schneck & McHugh

[57] ABSTRACT

A method of patterning magnetic material so as to achieve desired magnetic properties includes providing a metallic substrate having an array of raised islands spaced apart by depressed regions in a pattern to define geometries of magnetic devices. In one embodiment, heating the metallic substrate yields magnetic films that possess improved properties with respect to coercive force, anisotrophy field, permeability, and saturation magnetization of both magnetically hard and magnetically soft materials. In another embodiment, a release layer having a low adhesion with respect to attachment to the metallic substrate or a non-metallic substrate is deposited prior to formation of multilayer stacks, thereby reducing the risk of splitting such a stack. In yet another embodiment, the magnetic devices are formed in the depressed regions, rather than on the raised islands.

28 Claims, 4 Drawing Sheets

METHOD OF PATTERNING MAGNETIC MEMBERS

TECHNICAL FIELD

The present invention relates generally to magnetic materials and more particularly to methods of patterning magnetic layers to form discrete magnetic members.

BACKGROUND ART

Advantages of patterning magnetic materials and methods of patterning magnetic layers are known. Typically, patterning is carried out using techniques common in the art of semiconductor processing, such as photolithographic techniques.

One method of photolithographically patterning a homogeneously deposited magnetic film is to coat the film with a photoresist and then to remove selected portions of the photoresist in order to expose regions of the magnetic film. The exposed regions of the film may then be removed by applying an etchant. The remaining photoresist is stripped, leaving the magnetic film in a desired pattern.

Magnetic film patterning can also be accomplished during the step of depositing the film on a substrate. For example, during a sputter deposition, a mask can be positioned between a deposition source and a substrate on which the film is to be deposited. The mask is patterned to selectively block or pass the magnetic material being deposited onto the substrate. This technique is employed with acceptable results for patterns that need not be precise, since vapor scattering which occurs as the deposition material travels through the mask will limit the preciseness of patterns formed in this manner.

U.S. Pat. No. 5,017,255 to Calhoun et al. describes a method of transferring a pattern onto a substrate. The substrate is made of an embossable material, and is typically a polymer such as polyimide. The embossed polymeric substrate can be formed by extruding a softened polymer onto a machined embossing roll having an imprinted negative of a desired pattern, so as to imprint the design into the polymer. Calhoun et al. teaches that typically a metal layer is then deposited onto the embossed surface of the polymeric substrate, but semiconductor or dielectric materials may also be employed. Calhoun et al. does not describe the method as being employed with magnetic materials.

An ever-present goal in the process of fabricating magnetic devices is maximizing the magnetic properties of the magnetic structure for its intended purpose. Some devices require one or more layers of magnetically "soft" material, i.e. a material having a high permeability and a low coercive force. Other devices include one or more magnetically "hard" layers, i.e. layers having a high coercive force. Still other devices include a combination of magnetically hard and magnetically soft layers. For example, magnetoresistive recording heads utilize patterned hard magnetic materials to bias soft magnetic films in order to obtain optimum performance. The heads operate best when the magnetization vector is at an angle of approximately 45° to the direction of flux travel. However, magnetoresistive heads are typically rectangular, so that the demagnetizing field aligns the magnetization vector at an angle of 90° to the direction of flux travel. Therefore, a magnetically hard film that has a high level of stray flux is placed adjacent to the magnetically soft magnetoresistive head to rotate, or bias, the magnetization vector into the position for optimum performance. Because precise control of the biasing field is necessary in order to properly bias the head, the magnetically hard film is patterned to form a structure that provides the desired control.

Low frequency electromagnetic interference (EMI) shielding is another application for patterned magnetic layers. The shielding properties of a given material are proportional to the product of permeability and electrical conductivity, and are inversely proportional to the frequency of interest. Therefore, while high frequency shields can be made with thin films of conductive metal, low frequency metal films are generally quite thick. However, magnetic materials such as supermalloy or permalloy having a high permeability and electrical conductivity can be used to form thin low frequency EMI shields. The materials can be placed on containers enclosing sensitive electronic equipment, such as computers. Maximum EMI protection is obtained by causing the shield to be absorbent of the EMI, rather than being reflective. However, absorption is hindered by eddy currents which prevent the EMI from entering the energy-absorbent material. For thin films, eddy currents are proportional to conductivity, permeability, frequency and surface area. For fixed material properties, eddy current shielding can be reduced by decreasing the effective surface area of the EMI-absorbing material. A homogeneous film of metallic magnetic material can be patterned to form an array of separate, electrically isolated regions spaced apart by regions in which the material has been removed.

Another structure that is formed using patterned magnetic layers is a magnetic electronic article surveillance (EAS) tag, as described in U.S. Pat. Nos. 4,960,651 to Pettigrew et al. and 5,083,122 to Piotrowski et al. EAS tags are also referred to as anti-pilferage tags, and consist of one or more high permeability, low coercive force magnetic films. If more than one soft magnetic thin film is used, adjacent films are separated by a non-magnetic thin film. An EAS tag that is passed through an interrogating magnetic field which exceeds the coercive force of the tag will undergo changes in the direction of the magnetization vector of the tag in response to the interrogating field. The orientation changes of the magnetization vector are measurable as a voltage signal by detector electronics of a surveillance system. In addition to the magnetically soft films, a layer of magnetically hard material may be employed to allow the tag to be selectively deactivated. Deactivation is accomplished by placing the magnetically hard layer in its fully magnetized state. In this state, the fringing field from the hard magnetic layer penetrates the soft magnetic layer or layers, preventing the tag from responding to the interrogating field.

As previously noted, the operation of a magnetoresistive recording head, an EMI shield and an EAS tag depends to a significant degree upon fabrication techniques utilized in forming the structure. An object of the invention is to provide a method of patterning magnetic material, wherein desired magnetic properties are more easily achieved than by employing the approaches described above.

SUMMARY OF THE INVENTION

The above object has been met by improving patterning conditions at a microscopic level. A desired coercive force and a permeability for a thin magnetic film can be achieved by controlling conditions at a film-substrate interface. In a first embodiment, a metallic substrate is provided to define a selected pattern for the film. The metallic substrate has an array of raised islands that are spaced apart from each other by depressed regions. Because the substrate is metallic, the impact of deposited ions with the substrate is not likely to cause substrate melting at a microscopic scale. Thus, in comparison to the use of a polymeric substrate, the metallic substrate reduces the risk that localized substrate melting will create crystallization or will introduce contaminants that damage the film lattice. Typically, the substrate is not ferromagnetic.

In one embodiment of the invention, the metallic substrate is heated during the depositing of magnetic material onto the raised islands of the substrate. In sputter depositing a magnetic film on the heated substrate, an incident metal atom or ion will reach the substrate in a high energy state, but the influence of the heating provides an anneal of the magnetic film during the deposition process. The deposition anneal achieves recrystallization and strain relaxation of disorders that are produced by impinging atoms or ions. Thus, the high energy atoms or ions find a position of low energy. Magnetic films are generally magnetostrictive, i.e. possess magnetic properties that change with stress on the film. Although there are alloys having zero magnetostriction, for most magnetic films stresses that arise on a microscopic scale will adversely affect magnetic properties. Stress is particularly present at the substrate-film interface, where particles solidify before reaching a non-stressed condition by obtaining a site in the atomic lattice. An advantage of heating the raised islands of the metallic substrate is that impinging particles are significantly less likely to cause stresses at the substrate-film interface. The coated metal substrates may also be heat treated to anneal the deposited magnetic film prior to transfer, thereby further achieving desired properties.

Even in the absence of heating the substrate during film deposition, the use of a metallic substrate having the array of raised islands provides advantages. The surface smoothness of a substrate plays a major role in determining thin-film magnetic properties. For a soft magnetic film, very smooth substrates are required to achieve a low coercive force and high permeability, since surface roughness reduces soft magnetic properties by pinning the magnetization vector through surface defects. Regarding magnetically hard magnetic films, random surface roughness affects magnetic properties in an unpredictable fashion, since a stray field in one portion of the hard magnetic film may be much different than the stray field in another portion.

Metallic substrates can be chemically or electrochemically smoothed to exacting tolerances. Substrate smoothness is particularly important if magnetic structures to be formed on each of the raised islands of the substrate are composed of a plurality of layers, such as the alternating films of magnetic and non-magnetic materials deposited to form an EAS tag. Surface roughness tends to propagate and magnify through the structure, causing undesirable connections between metal magnetic films that are on opposite sides of a non-magnetic film. Smooth surfaces allow fabrication of very uniform multi-layer stacks, since layers do not overlap one another as a result of variations in height at the surface of the substrate.

In depositing the magnetic film, the members on adjacent raised islands should remain discrete from each other. This is accomplished by limiting the thickness of the deposited film so as not to completely fill the depressed regions between the adjacent raised islands. The deposition technique also plays a role in ensuring discrete members. Optionally, the sidewalls of the raised islands can be at an angle to the normal with respect to the top surface. Inward angling, or dovetailing, of the sidewalls will reduce the risk that a material being deposited will have sufficient step coverage to link adjacent magnetic members.

Ideally, the magnetic film is deposited at a precise angle of 90° relative to the substrate. Film deposition at an angle to the normal will result in the formation of lobes at the sides of the members, rather than sharp corners aligned with the sidewalls of the raised islands. That is, "edge smear" results from non-normal application. The difficulty with achieving the ideal is that the fabrication equipment required to ensure precise-angle deposition is typically cost-inefficient and slow. It has been discovered that by exerting normal forces onto the discrete members atop the raised islands, any lobes that extend beyond the sidewalls of the raised islands will tend to disconnect from the remainder of the magnetic film. For example, the substrate may be passed between rollers which compress the discrete members and cause any lobes to be sheared from the portion of the film material that is directly atop the raised islands. As an alternative or an addition to exerting compressive forces, the lobes can be removed by a quick chemical etch. If a release layer to be described immediately below is chemically inert to the etch, the edge smear can be treated without damage to the magnetic structures. The removal of the lobes eliminates edge curling domains which greatly reduce the magnetic permeability of the discrete members.

In another embodiment of the present invention, a substrate having an integral array of raised islands is coated with a release layer prior to forming the magnetic members on the raised islands. The release layer is selected of a material having a low adhesion with respect to attachment to the substrate, so that following formation of the magnetic members on each one of the raised islands, the magnetic members can be easily dislodged from the raised islands. Consequently, there is little tendency for a multilayer magnetic member to separate at the interface of any two layers of the magnetic multi-layer stack. In this embodiment, the substrate need not be metallic. Moreover, the release layer may comprise two films which are separated from each other when magnetic members are removed from the raised islands.

An advantage of the present invention is that the structural integrity of fabricated magnetic structures is ensured. Regardless of whether a release layer is utilized, structural integrity is enhanced because the raised islands on the substrate define the desired pattern without requiring etching, cutting or other potentially integrity-attacking techniques for dividing a homogeneous magnetic film into discrete magnetic members. The release layer further reduces the potential of damaging magnetic members by providing an interface at which the magnetic members reliably separate from the substrate.

For embodiments in which the substrate is metallic, an advantage of the present invention is that the metallic substrate is not prone to outgassing either at a macroscopic level when the substrate is heated to achieve a film having desired magnetic properties or at a microscopic level when ions contact the magnetic substrate during deposition.

In another embodiment of the present invention magnetic structures are formed in the depressed regions, rather than on the raised islands of a substrate that is not necessarily metallic. In this embodiment, the substrate may have one surface configured in the same manner as a surface of a waffle, with raised regions spacing apart depressed surfaces that define the magnetic members. The raised regions define the patterning of deposited films, which include one or more magnetic films. The substrate is then severed to separate the magnetic members from each other. For example, a layer of tape may be applied to the underside of the substrate prior to severing the substrate. The tape then facilitates handling of the independent magnetic members. Preferably, the substrate is weakened at the peripheries of the depressed surfaces. Weakening can be accomplished by providing perforations that facilitate breaking the substrate at the desired areas.

The present invention is particularly suited to fabricating multilayer stacks for magnetic members such as EAS tags. However, single layer magnetic members may also be formed using the raised islands and depressed regions. Contemplated applications include fabricating EMI shields, magnetoresistive recording heads, and "paint flakes," i.e. discrete magnetic structures that are dislodged from the substrate and then added to a binder in a process to form a magnetic paint or coating having macroscopic properties significantly different than those of the individual magnetic structures. Typically, the magnetic members are removed by depositing an adhesive layer on a side of the members opposite to the substrate, whereafter removal of the adhesive layer separates the members from the substrate. Other methods of removal are possible, however. For example, the substrate can be deformed to "pop" the magnetic members from the substrate.

BEST MODE FOR CARRYING OUT THE INVENTION

Figure 1:
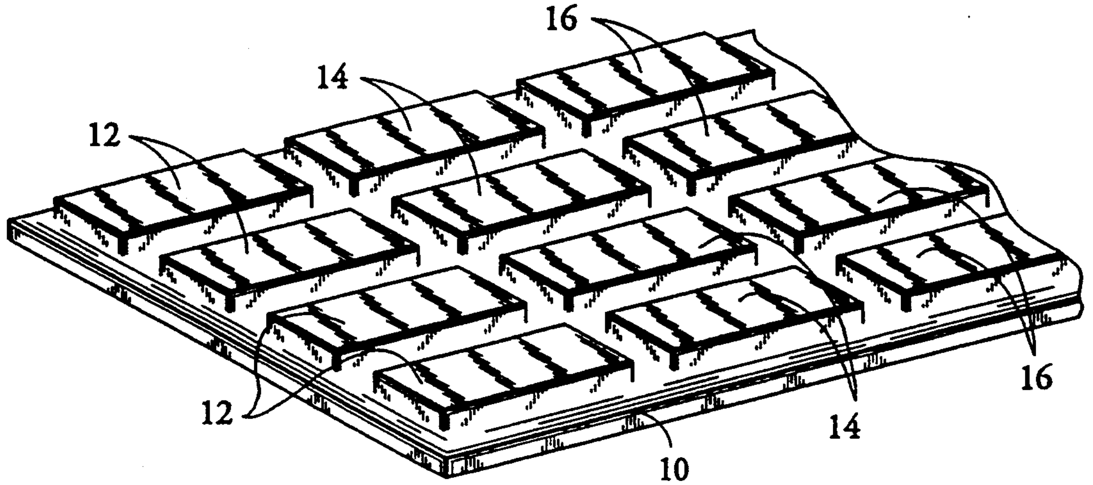
FIG. 1 is a perspective view of a substrate having raised islands for the fabrication of discrete magnetic members in accordance with the present invention.
Figure 2:
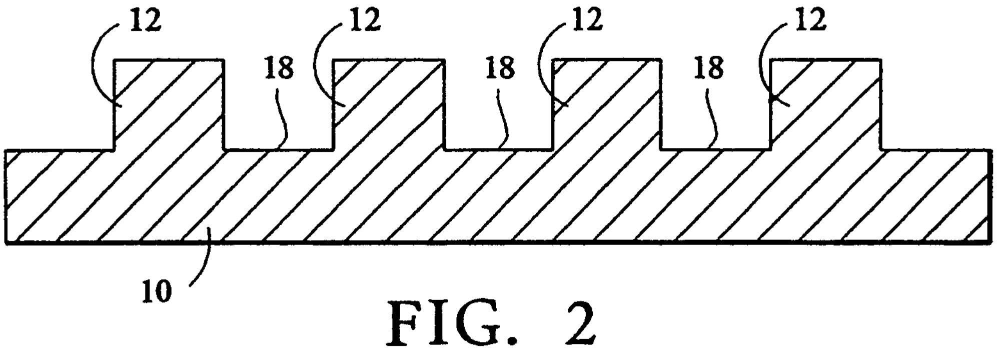
FIGS. 2–7 are side sectional views of process steps for patterning magnetic members in accordance with the present invention.

With reference to FIGS. 1 and 2, a unitary metallic substrate 10 is shown as including rows of raised islands 12, 14 and 16. Adjacent islands 12–16 are spaced apart by depressed regions having horizontal surfaces 18.

The geometry of the raised islands 12–16 will depend upon the structures to be fabricated. That is, the desired geometry is a matter of design choice to a person skilled in the art. For example, in forming a magnetic recording head, the best performance is obtained by patterning rectangular islands having lengths that are significantly greater than the widths. Magnetic films to be patterned using the method described below will have a maximum permeability when the magnetization vector is perpendicular to an incident magnetic field. As the angle between the magnetization vector and the magnetic field is changed, the permeability decreases by $\cos^2 \Theta$. Magnetic electronic article surveillance (EAS) tags are typically rectangular, since elongated tags alleviate magnetization effects which might inhibit the generation of readily distinguishable, high-order harmonics of a magnetic field created by an interrogation system for detecting an activated EAS tag. On the other hand, the optimal shape of paint flakes may be a hexagonal configuration.

While the unitary metallic substrate is shown as having rectangular raised islands 12–16, other geometries are possible. For example, multilayer EAS tags may be square. A typical pattern may be one in which the raised islands are each 12.7 mm×12.7 mm, with spaces of 0.127 mm between adjacent islands. A depth of the depressed regions may be 0.0508 mm. The selection of dimensions will depend upon the magnetic structure in accordance with parameters understood by persons skilled in the art.

The upper surfaces of the raised islands 12–16 should be smooth. Surface smoothness plays an important role in determining the properties of thin films, particularly thin magnetic films. Because the substrate 10 is made of metal, rather than a polymer as conventionally employed, improved surface smoothness is obtained with a high degree of repeatability. Metal substrates can be chemically or electrochemically smoothed to exacting tolerances. Preferred materials for forming the substrate 10 are copper and electroformed nickel, but other materials may be employed.

Figure 3:
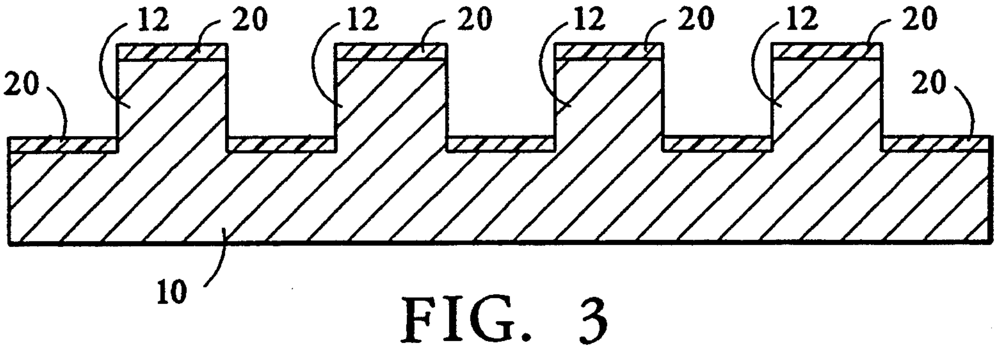

In one embodiment of the present invention, the substrate 10 is coated with a release layer 20, shown in FIG. 3. The release layer may be sputter deposited upon the substrate, but other deposition techniques may be utilized. While the release layer 20 may be a single layer as shown in FIG. 3, a particularly suitable method of forming the layer is to first deposit, at lower power, a thin film of iron-nickel alloy and to then sputter silicon nitride or silicon in the presence of hydrogen. The bond between the hydrogenated silicon compounds and the iron-nickel alloy sputtered at low power is significantly weaker than other surface bonds to be described below. Consequently, the bond at the interface of the two films can be broken when it is desirable to separate the substrate 10 from structures formed above the iron-nickel alloy deposited upon the raised islands 12. A single film release layer may be employed, but in the preferred embodiment the release layer is comprised of two films which have a sufficiently low bond strength to each other that separation of the two films can be reliably accomplished. The selection of acceptable film materials is a matter of design choice understood by persons skilled in the art. Another suitable release layer may be simply a film of metal sputtered at low power and high pressure.

The release layer 20 is shown as being formed on the metallic substrate 10. While this is the preferred embodiment, the benefits of a release layer are also important in use of a polymeric substrate, such as polyimide, having raised islands.

The release layer 20 plays an important role in the fabrication of a wide variety of magnetic devices. However, the release layer may not be critical in each application. For example, if a single-layer magnetic structure is to be formed, splitting between two layers of the magnetic structure is not an issue, so that the release layer is less important. Moreover, if the structure to be formed is an EMF shield, it is foreseeable to leave the structure on the substrate 10 during use. In this case, the release layer is not necessary.

Figure 4:
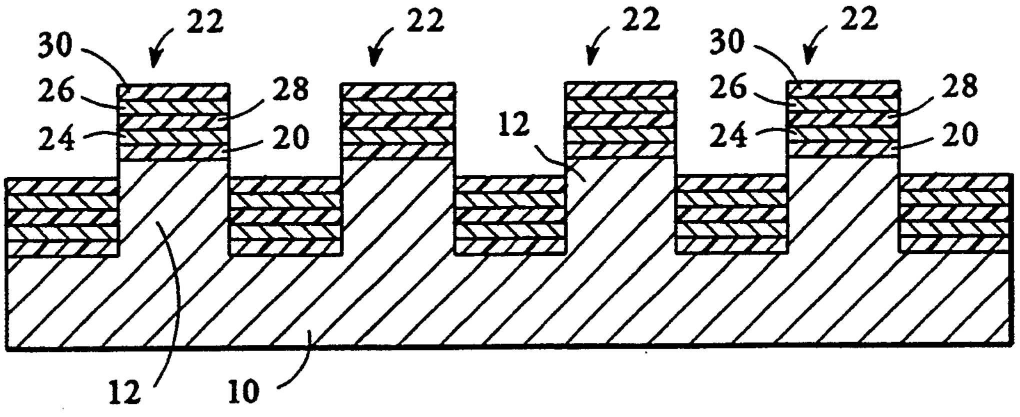

Referring now to FIG. 4, following formation of the release layer 20 on the raised islands 12, magnetic devices 22 may be fabricated. The techniques for depositing films to form the magnetic devices and the selections of film materials are dependent upon the devices to be fabricated, and are design choices readily understood by a person skilled in the art. In FIG. 4, EAS tags may be formed by sequentially depositing first and second magnetically soft films 24 and 26 and first and second non-magnetic films 28 and 30 onto the substrate 10. To ensure structural integrity, the films 26–30 should have bond strengths that exceed the bond strength of the devices to the raised islands. In the preferred embodiment, the magnetic films are deposited using sputtering techniques. The magnetic films can also be formed using evaporation techniques. A typical maximum for heating the substrate is 250° C. The metallic substrate 10 has a high thermal conductivity, facilitating uniformity of heating at the islands 12. At a microscopic level, an incident ion or metal atom will ultimately adhere in a low energy state to a heated metallic substrate. In comparison, an ion or metal atom which contacts a polymeric substrate is more likely to create localized melting and be immersed in a "polymer goo," thereafter becoming trapped in a metastable state that creates stressed magnetic films. Even at a microscopic scale, stresses or admixtures of metals and polymers at the interface will affect the magnetic properties of most films.

Post-deposition anneals have been used to increase the surface mobility of the atoms of magnetic films, so as to reduce stress. However, it has been discovered that sputter depositing the films on a heated substrate offers improved performance compared to post-deposition anneals. Depositing the films on the heated substrate 10 of FIG. 4 greatly reduces the quantity of microscopic voids and metastable nucleating sites that adversely affect conditions for achieving desired magnetic properties. Nucleating sites, once formed, have walls that are difficult to remove. It is preferred to deposit films on the heated substrate, avoiding such imperfections from the start.

As noted, polymeric substrates can be heated, but the heating will render the substrate more susceptible to melting both at the microscopic and macroscopic scale. Moreover, polymeric substrates will generate outgasses that potentially will contaminate deposited films. For example, the stable polyimide film sold by Dupont Corporation under the trademark KAPTON® outgasses carbon dioxide and carbon monoxide. The metallic substrate 10 of FIG. 4 is preferably made of the nonreactive metal substrate which produces virtually no outgassing.

The total thickness of the films 20 and 24–30 should be less than the height of the islands 12, thereby forming discrete devices 22. Compared to conventional methods of patterning magnetic films, at no time is a large homogeneous film formed across the substrate 10. Large films of unpatterned magnetically soft material will generally have a weak demagnetizing field. As a result, the magnetization vector of different domains will be spread over a geometric distribution. The resulting non-alignment of the magnetic domains reduces the effective permeability, which is defined as one plus the change in magnetization with change in magnetic field. Large permeabilities are obtained when the magnetization vectors of the different domains are perpendicular to the direction of an applied magnetic field. Therefore, devices such as magnetic recording heads that require large permeabilities are patterned into geometries for which the resulting demagnetizing field will force the magnetization vector to lie perpendicular to the direction of the applied field.

FIG. 4 shows the magnetic devices 22 as having only two magnetic films 24 and 26. Typically, an EAS tag will include a greater number. For example, the magnetic multilayer stack may comprise fifteen magnetic films of permalloy, with each film having a thickness of approximately 1500 Å. Adjacent permalloy films should be spaced apart by non-magnetic layers 28 and 30. The non-magnetic layers for EAS tags are typically electrically insulative. While not limiting, a list of acceptable materials includes silicon nitride, silicon oxide, and metal oxides, with a typical thickness being 100 Å. Silicon nitride is the preferred non-magnetic film, but the selection is a matter of design choice by a person skilled in the art. In the formation of EAS tags 22, one of the magnetic films 24 and 26 may be made of a magnetically hard material that allows the tags to be selectively deactivated. Fully magnetizing the hard magnetic film prevents soft magnetic films from reacting to an interrogating field. A non-magnetic layer 28 is typically not deposited between the magnetically hard film and an adjacent magnetically soft film.

Figure 5:
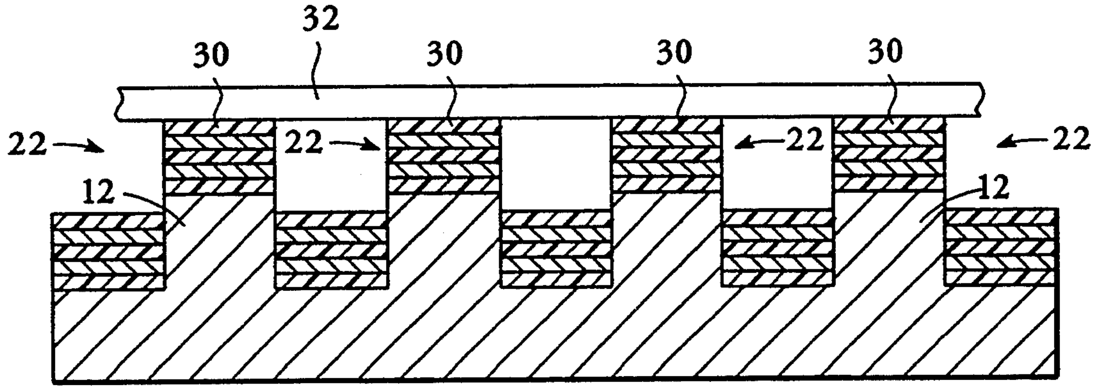

Referring now to FIG. 5, an adhesive layer 32 is then formed to contact each of the magnetic devices 22. The adhesive layer should be made of a material that binds well to the uppermost film 30 of the magnetic devices. The adhesive layer may be deposited in situ, or may be in the form of a web of tape that is pressed onto the magnetic devices. Selection of an adhesive material and the deposition technique are design choices for a person skilled in the art. Moreover, in some applications of the invention, an adhesive layer may not be desirable. For example, magnetic paint flakes are preferably "popped" from the substrate, as by deforming the substrate.

In the fabrication of magnetic devices, such as EAS tags, a great deal of study has been spent in allowing the deposition of films to be onto increasingly thinner substrates, thereby increasing film permeance. However, the stiffness of a film is proportional to the cube of the thickness, so thin substrates are flimsy and prone to creasing. Therefore, depositing films on a substrate becomes more difficult as the substrate is made thinner. Following deposition and patterning, EAS tags and the like must be applied to a platform surface. However, in using the raised islands 12, 14 and 16 of FIGS. 1–5, substrate handling and platform application characteristics can be separated. The magnetic devices on the raised islands 12 can be sputtered onto a thick substrate, so that handling is not a problem. The devices can then be transferred directly to a platform or can be laminated onto a vanishingly thin substrate. Thus, the raised islands reduce manufacturing cost and manufacturing difficulties, while improving performance of the resulting magnetic devices.

Figure 6:
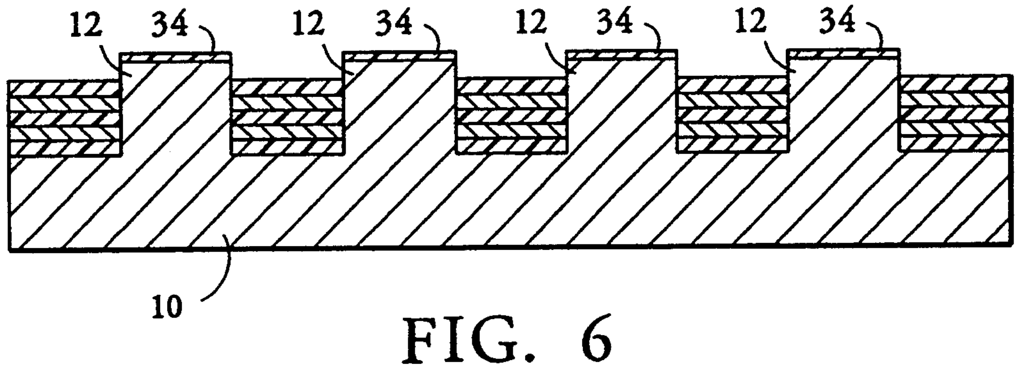
Figure 7:
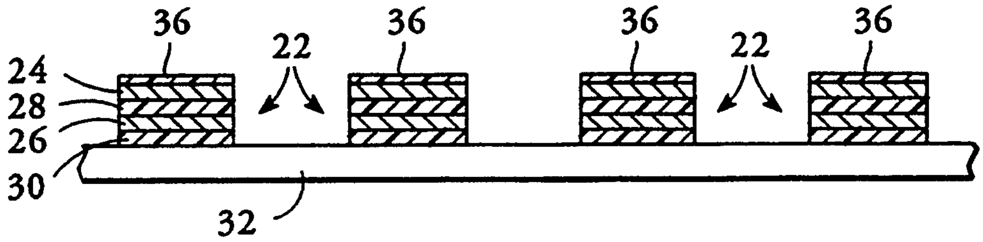

Referring now to FIGS. 6 and 7, the adhesive layer 32 is then removed from the substrate 10. The release layer is shown as being separated at the interface within the release layer, with the iron-nickel alloy film 34 remaining on the raised islands 12 and the hydrogenated silicon compound 36 remaining with the individual magnetic devices 22. The compound 36 can then function as a protective layer for the multilayer stack.

The discrete magnetic devices 22 of FIG. 7 may be in a condition to be utilized as desired. For example, in the case of fabricating EAS tags, the adhesive layer 32 can be cut between adjacent tags and the tags can then be individually mounted to articles using conventional approaches.

Figure 8:
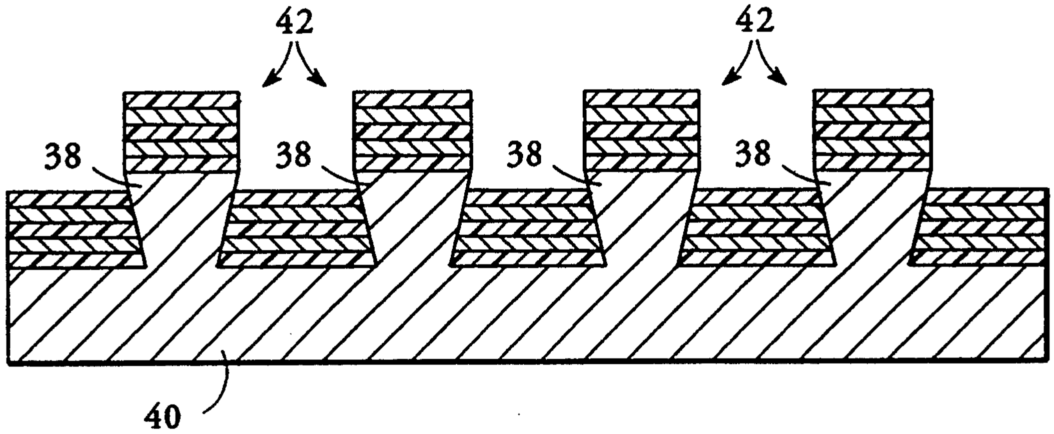
FIG. 8 is a side sectional view of a second embodiment of a substrate of FIG. 4.

In referring to FIG. 4 it was noted that the multilayer stack that forms the magnetic devices 22 should not have a height that exceeds the height of the raised islands. In FIG. 8, raised islands 38 of a substrate 40 are shown as having non-vertical sidewalls. Etching methods that produce a degree of undercutting are known in the art. The non-vertical sidewalls reduce the risk that a deposited film will have sufficient step coverage to join film material on the raised islands to film material in the depressed regions. Therefore, magnetic devices, such as EAS tags 42, may be formed with less risk that adjacent devices will be inadvertently joined.

Figure 9:
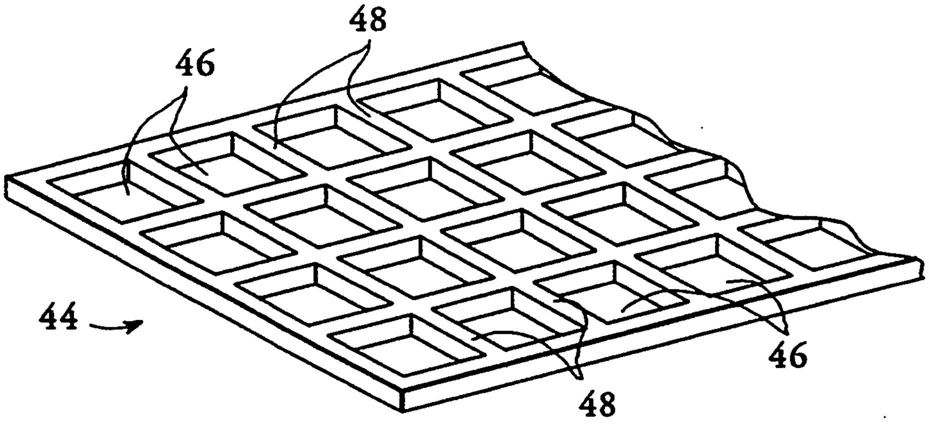
FIG. 9 is a perspective view of a substrate in accordance with another embodiment of the present invention.
Figure 10:
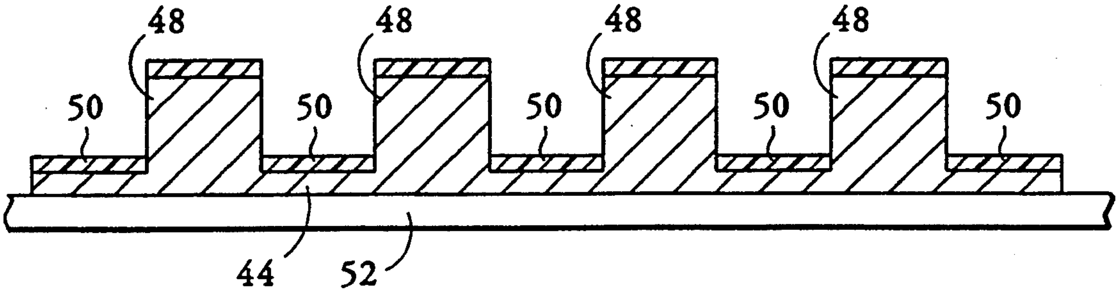
FIG. 10 is a side sectional view of a magnetic layer and an adhesive layer attached to the substrate of FIG. 9.

Another embodiment of the present invention is one in which the magnetic devices are formed in the depressed surfaces, rather than on the raised islands. For example, in FIGS. 9 and 10 a substrate 44 may have a waffle-like configuration, so that each depressed surface 46 is completely enclosed by raised regions 48. The magnetic devices are then formed by depositing one or more films 50 on the substrate. The shape of the depressed surfaces will determine the shape of the magnetic devices. The structure of the magnetic devices is a matter of design choice to a person skilled in the art. The substrate can then be severed in a manner to free the magnetic devices from each other. For example, a layer of adhesive 52 may be deposited on the side of the substrate opposite to the raised regions. Severing the substrate along the raised regions will then free the individual magnetic devices with respect to each other, but the devices will remain attached to the adhesive. Preferably, the substrate is weakened at the perimeters of the depressed surfaces. The weakening can be accomplished by perforating each perimeter. The severing can then occur by merely breaking the substrate at the weakened areas. In this embodiment, the substrate should be as thin as possible, since each magnetic device remains attached to a portion of the substrate.

Figure 11:
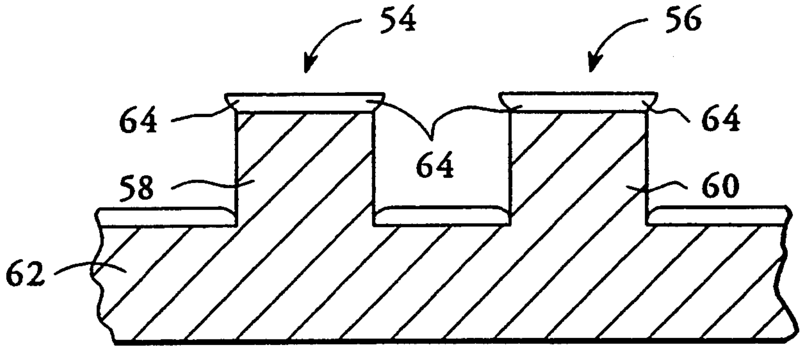
FIG. 11 is a side sectional view of magnetic members formed by nonperpendicular deposition of magnetic layers onto a substrate.

Referring again to FIG. 4, film deposition at a precise 90° angle relative to the metallic substrate 10 forms magnetic devices 22 having sharp corners aligned with the sidewalls of the raised islands 12. This geometry achieves a high magnetic permeability. However, fabrication equipment capable of ensuring precise normal deposition is both expensive and slow. In FIG. 11, magnetic devices 54 and 56 have been formed on raised islands 58 and 60 of a substrate 62 using non-normal deposition. While shown as a single layer, the devices are preferably multi-film members such as described above. Non-normal deposition causes lobes 64 to be formed beyond the sidewalls of the raised islands 58 and 60. This results in edge curling domains that greatly reduce the magnetic permeability of the devices.

Figure 12:
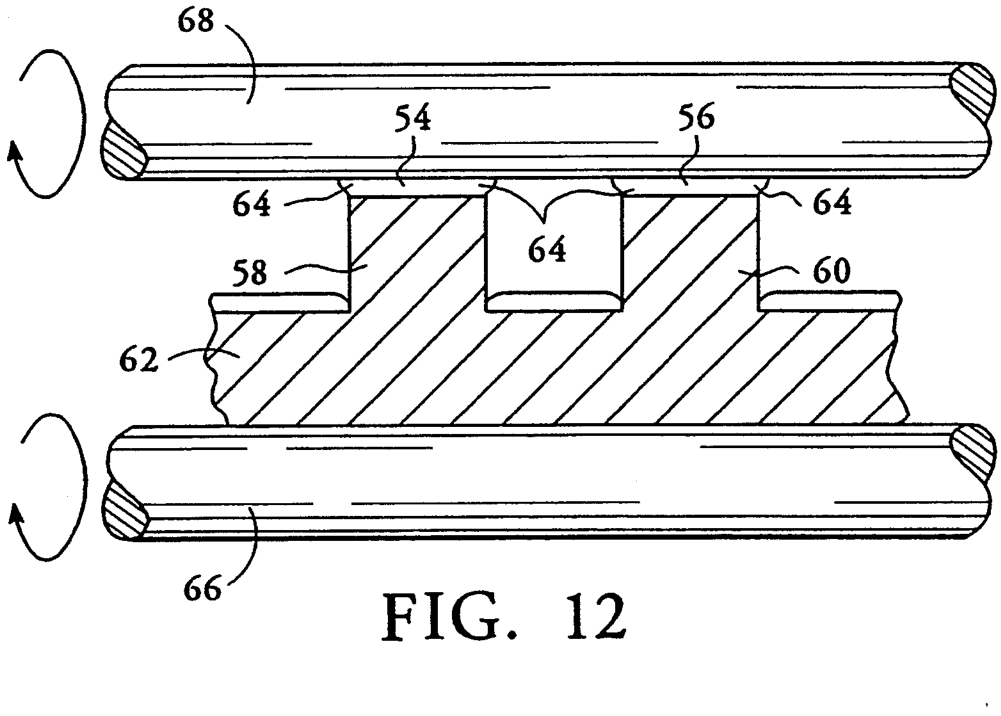
FIG. 12 is a side sectional view of the structure of FIG. 11 being passed between rollers to breakaway lobes on the magnetic members.

Referring now to FIG. 12, the structure of FIG. 11 may be passed between two rotating rollers 66 and 68 in order to exert large normal forces that will tend to shear the lobes 64 from the magnetic devices 54 and 56, leaving the magnetic devices with more sharply defined edges. The use of double rollers is not critical. A single roller may be employed to provide compression at one surface while the opposite surface is supported by a plate. Other arrangements are also contemplated.

The portion of each magnetic device 54 and 56 that resides directly above the raised islands 58 and 60 remains generally unaffected by the compression. If the substrate 62 is formed of polyimide, the substrate will resiliently compress. On the other hand, the side lobes 64 will breakaway as a result of a shearing action. By breaking away the lobes, edge curling domains are reduced and the magnetic properties of the devices are enhanced. The lobes 64 alternatively may be removed by a chemical etch, but the release layer should be largely inert to the etch. Moreover, the two techniques of compressing and etching the devices can be combined.

In experiments involving the present invention, magnetic multilayer stacks having five permalloy layers of a thickness of 1500 Å and having four silicon nitride spacer layers of a thickness of 300 Å were deposited onto patterned substrates of KAPTON® and copper. The pattern of a raised island was 12.7 mm×12.7 mm square, with spacings of 0.127 mm between islands. The copper substrate was 0.508 mm thick, while the KAPTON® substrate was 0.1778 mm thick. The depressed regions were formed by a chemical etch to a depth of 0.0508 mm. The low frequency, i.e., 5 MHz to 100 MHz, hard axis permeability magnitude was measured for each sample from the two substrates, using a swept frequency permeameter. It was found that when the drum upon which the substrate was placed was kept at room temperature during deposition of the multilayer stack, the samples from the copper substrate had a permeability approximately twenty percent greater than the samples from the KAPTON® substrate.

Low frequency, hard axis permeability of patterned metallic multilayer stacks was also studied as a function of surface roughness. A 0.2508 mm polished copper substrate was provided, as was a 0.2508 mm copper sheet that was mechanically worked. The two metal substrates provided contrasting surface roughnesses. The multilayer stacks as described in the above paragraph were formed. In a comparison of magnetic properties, it was found that the films made on the polished copper had higher permeabilities than the films made on the rougher, mechanically worked substrate. It is believed that this is due to the interlayer coupling that is created by the condition of surface roughness at the substrate. Protrusions from the surface introduce nonalignment of the different layers in the multilayer stack, resulting in increased eddy currents. The polished copper substrate provided an extremely smooth surface that did not misalign the layers.

In separate experiments, three magnetic multi-layer stacks that differed in the choice of spacing material were patterned on substrates of KAPTON® and copper. The magnetic multilayer stacks consisted of fifteen permalloy layers of a thickness of 1500 Å, and fourteen spacer layers of silicon nitride, copper, or copper-aluminum alloy having a thickness of 300 Å. The pattern was a 12.7 mm×12.7 mm square pattern, with 0.127 mm spacings. A polished copper substrate had a thickness of 0.508 mm, while the KAPTON® substrate had a thickness of 0.1778 mm. Depressed regions between raised islands were formed by a chemical etch to a depth of approximately 0.0508 mm. The multilayer stacks were deposited directly onto the substrates. A layer of adhesive was then applied and the pattern transferred to another substrate. It was found that transfer from the polymeric substrate was quite difficult, with the magnetic multilayer stack frequently separating between layers, rather than at the interface of the stack with the substrate. Transfer from the metal substrate proved to be easier, with very little damage to the multilayer stacks.

A release layer on the KAPTON® and copper substrates significantly increased the manufacturing yield. For example, a thin layer of an iron-nickel alloy sputtered at low power was formed on the substrates, followed by a sputtering of a silicon and silicon nitride in the presence of hydrogen. The bond between the hydrogenated silicon and the iron-nickel alloy was significantly weaker than other surface bonds. For both the polymeric substrate and the metallic substrate, the patterned multilayer stack transferred easily and without damage to the stack. The separation occurred at the interface of the hydrogenated silicon and the iron-nickel alloy, leaving a protective coating of silicon nitride at the top of the transferred pattern.

While FIGS. 1–8 illustrate the fabrication of multilayer stacks, the present invention may be utilized to form structures having a single layer of magnetic material. For example, a film of magnetically hard material may be formed on the raised islands 12, 14 and 16 of the substrate of FIG. 1, thereby providing a pattern of EAS keepers. The EAS keepers may then be removed from the raised islands and laminated to magnetically soft films to form completed EAS tags. In another example, a single magnetically soft film can be transferred to a thin adhesive film, such as a layer of polyimide adhesive. A larger multilayer device that is not restricted to a substrate can then be assembled by attaching together a desired number of the two-film devices.

The invention described herein is intended to embrace such alternatives, modifications, applications and variations as fall within the spirit and scope of the appended claims.

We claim:

1. A method of patterning magnetic material comprising:

positioning a metallic substrate to receive a film of magnetic material, said metallic substrate having an array of raised islands spaced apart by depressed regions;

heating said metallic substrate; and forming a layer of magnetic material atop said heated metallic substrate such that a raised pattern of magnetic members is formed, forming said layer including limiting the thickness of said layer such that magnetic material formed on said raised islands remains discrete from magnetic material formed in said depressed regions.

2. The method of claim 1 wherein forming said magnetic layer is a step of depositing a magnetically soft material, said method further comprising depositing a plurality of layers of said magnetically soft material to form a multilayer surveillance tag.

3. The method of claim 2 further comprising forming a keeper layer of a second magnetic material on a top layer of said plurality of layers of magnetically soft material, said keeper layer having a coercivity greater than the coercivity of said magnetically soft material.

4. The method of claim 1 wherein forming said magnetic layer is a step of depositing a layer of magnetically hard material.

5. The method of claim 1 further comprising exerting pressure on said layer of magnetic material to remove portions of said layer that extend beyond said raised islands in lateral directions, thereby improving magnetic properties of said magnetic members.

6. The method of claim 1 further comprising etching said layer of magnetic material in a manner to remove portions of said layer that extend beyond said raised islands in lateral directions, thereby improving magnetic properties of said magnetic members.

7. The method of claim 6 further comprising forming a release layer between said metallic substrate and said magnetic members, said release layer being selected of a material substantially inert to said etching of said layer of magnetic material.

8. The method of claim 1 further comprising removing said raised pattern, including depositing a layer of adhesive atop said raised pattern and further including separating said layer of magnetic material from said metallic substrate by raising said adhesive layer relative to said metallic substrate.

9. The method of claim 1 further comprising removing said magnetic members from said raised islands and adding said magnetic members to a binder to form a magnetic paint.

10. The method of claim 1 further comprising forming a release layer on said metallic substrate prior to forming said layer of magnetic material, including selecting said release layer to be made of a material having a greater bond strength to said magnetic layer than to said metallic substrate.

11. The method of claim 1 wherein forming said layer of magnetic material includes sputter depositing or evaporating magnetically soft material.

12. The method of claim 2 wherein forming said multilayer surveillance tag includes forming a non-magnetic layer between adjacent layers of magnetically soft material.

13. A method of forming a plurality of devices having magnetic properties comprising the steps of:

(a) providing a unitary metal substrate having metallic projections extending integrally outwardly from a surface thereof, said metallic projections each having a planar deposition surface;

(b) depositing a magnetically soft layer on said deposition surface of said metallic projections, thereby forming a pattern of structurally separate magnetic members on said metallic projections;

(c) forming a non-magnetic layer on said magnetically soft layer;

(d) repeating steps (b) and (c) a plurality of times to form a pattern of multilayer elements;

(e) forming a platform on said multilayer elements; and (f) separating said unitary metal substrate from said multilayer elements, thereby providing a plurality of separate multilayer elements.

14. The method of claim 13 further comprising heating said unitary metal substrate during said step of depositing a magnetically soft layer.

15. The method of claim 13 further comprising forming a magnetically hard layer on said multilayer elements, thereby providing surveillance tags having a keeper layer for deactivating said multilayer elements.

16. The method of claim 13 further comprising forming a release layer directly onto said metallic projections prior to depositing said magnetically soft layer, said release layer having a greater bond strength to said magnetically soft layer than to said metallic projections.

17. The method of claim 13 further comprising forming lobes extending beyond said metallic projections, compressing said multilayer elements formed in step (d) to remove said lobes extending beyond said metallic projections.

18. The method of claim 13 wherein forming said platform includes forming an adhesive layer.

19. The method of claim 13 wherein providing said unitary metal includes forming said metallic projections to include sidewalls at an angle to the perpendicular to said deposition surface.

20. A method of forming a plurality of devices having magnetic properties comprising:

providing a substrate having an integral array of raised islands spaced apart by depressed regions;

forming a release layer on said raised islands, including selecting a material having lower adhesivity with respect to attachment to said substrate than with respect to attachment to multilayer devices subsequently formed on the release layer;

forming each side multilayer device over each one of said raised islands, including depositing a plurality of films of magnetically soft material over said substrate; and removing said multilayer devices from said raised islands by dislodging said release layer from said raised islands.

21. The method of claim 20 wherein providing said substrate is a step of providing a metallic substrate.

22. The method of claim 20 wherein forming said multilayer substrate is a step of fabricating surveillance tags and includes depositing a magnetically hard layer atop said films of magnetically soft material.

23. The method of claim 20 wherein forming said release layer includes depositing a first release layer film on the metallic substrate and a second release layer film on the first release layer film wherein said first release layer film has a weaker bonding strength with respect to the second release layer film than with respect to the underlying metallic substrate and said second release layer film has a weaker bonding strength with respect to the first release layer film than with respect to the overlying multilayer devices.

24. The method of claim 23 wherein depositing said first release layer film is a deposit of metal and wherein depositing said second release layer film includes depositing silicon nitride in a hydrogen atmosphere.

25. A method of patterning magnetic material comprising:

providing a unitary substrate having an array of raised regions spacing apart depressed surfaces, said raised regions having a first height relative to said depressed surfaces;

forming a layer of magnetic material on said unitary substrate such that said magnetic material on said depressed surfaces has a thickness less than said first height, thereby forming a plurality of discrete magnetic members on said depressed surfaces; and severing said substrate such that said magnetic members are mechanically independent.

26. The method of claim 25 wherein said severing said substrate includes removing said raised regions.

27. The method of claim 25 wherein providing said unitary substrate includes providing structurally weakened areas about said depressed surfaces.

28. The method of claim 25 further comprising applying a layer of tape to a side of said unitary substrate opposite to said raised regions.

* * * * *

UNITED STATES PATENT AND TRADEMARK OFFICE

CERTIFICATE OF CORRECTION

PATENT NO. : 5,399,372

DATED : March 21, 1995

INVENTOR(S) : Craig A. Grimes et al.

It is certified that error appears in the above-indentified patent and that said Letters Patent is hereby corrected as shown below:

Title page, [75] Inventors: "Graig A. Grimes" should read - -Craig A. Grimes- -.

Claim 20, column 13, line 26, "having lower adhesivity" should read - -having a lower adhesivity- -.

Signed and Sealed this

Twentieth Day of June, 1995

Attest:

BRUCE LEHMAN

*Attesting Officer* *Commissioner of Patents and Trademarks*